United States Patent
Eckhart

[15] 3,704,705
[45] Dec. 5, 1972

[54] PROBE FOR ELECTRONIC MEDICAL DEVICE

[72] Inventor: Edgar O. Eckhart, Livingston, N.J.

[73] Assignee: Becton Dickinson & Company, East Rutherford, N.J.

[22] Filed: Dec. 9, 1970

[21] Appl. No.: 96,413

[52] U.S. Cl. .............................. 128/2 H, 128/2.05 F
[51] Int. Cl. .............................................. A61b 5/00
[58] Field of Search..128/2 A, 2 M, 2 R, 2 S, 2.05 D, 128/2.05 E, 2.05 F, 2.05 R, 2.06 E, 2.1 E, 2.1 R, 4, 404, 407, 408, 418, 2 H

[56] References Cited

UNITED STATES PATENTS

| | | | |
|---|---|---|---|
| 3,359,974 | 12/1967 | Khalil | 128/2.05 F |
| 623,022 | 4/1899 | Johnson | 128/407 |
| 3,446,742 | 9/1969 | Sinclair | 128/418 |
| 3,254,533 | 6/1966 | Tongret | 128/2 H |
| 3,196,375 | 7/1965 | Jones | 128/2.05 D |

*Primary Examiner*—William E. Kamm
*Attorney*—Kane, Dalsimer, Kane, Sullivan & Kurucz

[57] ABSTRACT

A flexible electronic medical probe is provided incorporating a spring inside a plastic sleeve. This construction provides the probe with good axial strength yet enables it to bend easily under lateral stress. The probe is stiff enough to enter a body orifice or affix a cot but will collapse before the force transmitted through the probe reaches the point where the probe tip can cause trauma to a patient.

4 Claims, 3 Drawing Figures

PATENTED DEC 5 1972 3,704,705

INVENTOR
EDGAR O. ECKHART
BY
ATTORNEYS

PROBE FOR ELECTRONIC MEDICAL DEVICE

BACKGROUND OF THE INVENTION

The present invention relates to a probe for an electronic medical device and more particularly to an improved electronic probe which virtually eliminates the danger of injury to a patient due to punctures as a result of its administration.

Electronic probes such as electronic temperatures have been used in hospitals, laboratories and research situations for some time. Such electronic probes have several advantages over conventional mercury thermometers including the ease with which their outputs may be read and utilized as well as a marked decrease in the time required and the possibility for human error during such usage.

One problem encountered with the probes of electronic thermometers heretofore available, as well as with conventional mercury thermometers, is that of the administrating personnel inadvertently puncturing the area surrounding the body orifice during administration. This problem arises particularly with children and disoriented patients who tend to move about erratically while their temperature is being taken.

In view of the above, it is the principal object of the present invention to provide an improved probe for an electronic thermometer which is sufficiently resilient and flexible to yield under stress when in use so as to preclude its internally puncturing a patient while, at the same time, being sufficiently stiff to enable insertion into a body orifice of the patient and to receive and retain a protective cot in position.

A further object of the invention is to provide the probe with a semi-rigid lead interconnecting it with its associated electronic equipment. The semi-rigid lead serves to relieve stresses on the probe when in position and also keeps the interconnecting wires away from the patient's environment thereby reducing the possibility of cross-contamination between the various patients that may be brought into contact with the device.

SUMMARY OF THE INVENTION

The above and other beneficial objects and advantages are attained in accordance with the present invention by providing an electronic temperature probe comprising an elongated member terminating in a blunt end and having a temperature sensing element mounted at the blunt end. The member is relatively rigid in the longitudinal direction and relatively flexible in the lateral direction whereby to enable the probe to enter a body orifice but collapse before the force which may be transmitted through the probe causes trauma to a patient. To this end, the present invention contemplates the use of a tightly coiled steel spring within a plastic sleeve to provide the desired properties to the elongated member.

The present invention also contemplates the use of a semi-rigid plastic tube extending between the probe and associated electronic equipment. The semi-rigid tube serves as a conduit to contain the electrical lead wires for the probe and to prevent these wires from touching the patient's environment.

DETAILED DESCRIPTION OF THE PREFERRED EMBODIMENT

Figures 1, 2, 3:
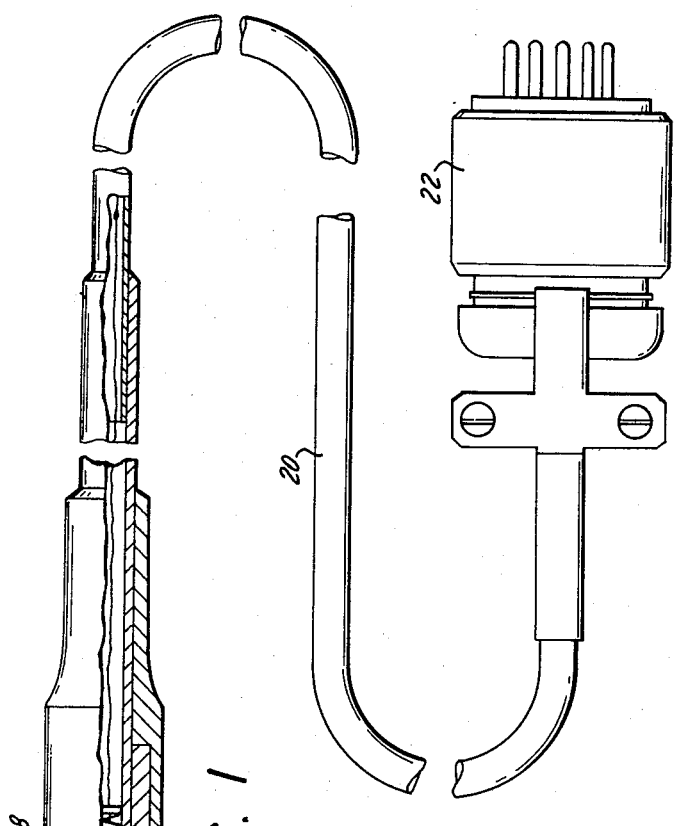
FIG. 1 is a side elevational view, partially in a section, of a probe for an electronic thermometer in accordance with the present invention.
FIG. 2 is an enlarged fragmentary sectional view of the forward end of the probe; and, FIG. 3 is a fragmentary side elevational sectional view of a section of the interconnecting tube between the probe and its associated electronic equipment.

Reference is now made to the drawing wherein similar components bear the same reference numeral throughout the several views. In FIG. 1, a probe 10 for an electronic medical thermometer is illustrated. The probe 10 comprises an elongated member 12 one end 14 of which is blunt and contains the temperature sensing element. The opposite end 16 of the probe is contained within a handle portion 18 formed of a suitable material such as a rigid plastic. The handle shown is of the type disclosed in the presently pending and commonly assigned application Ser. No. 035,006 and is designed to receive and retain a disposable cot in position over the probe during use and to eject the spent cot from the probe after each use.

A length of tubing 20 interconnects the rear of the probe with a terminal plug 22. The plug is designed for connection with a mating receptacle on the equipment containing the associated electronics. To this end, the leads from the sensing element extend through the probe, handle, and tubing to the appropriate pins of plug 22.

Reference is now made to FIG. 2 wherein the forward section 24 of the probe is illustrated. As shown, the elongated member 12 is formed of a length of tightly coiled spring 26 disposed within a sleeve 28 of a soft and readily flexible plastic material such as vinyl. The spring possesses sufficient axial strength to enable the probe to be placed within a body orifice without bending and yet be sufficiently flexible to bend under lateral stress without inflicting internal injury or trauma on the patient. The sleeve is sufficiently flexible to readily conform to any distortion of the spring without rupturing while, at the same time, maintaining a smooth external surface so as to facilitate insertion into a patient. In addition, both the spring and sleeve must be formed of materials compatible with insertion within a human orifice. The probe must also be able to support a cot in the manner described in the previously referred to, currently pending application. In a successful practice of the present invention, a closely wound, open ended stainless steel type 304 AMS 5688 spring was utilized within a flexible vinyl sleeve and found to meet each of the above criteria.

Still referring to FIG. 2, it will be noted that the plastic sleeve 28 extends beyond the forward end of spring 26 thereby defining a step extending into the forward end of the probe. A hollow plug 30 is provided at the forward end of the probe closing this end and resting on the spring. The plug is formed of a material such as polysulfone and defines the blunt forward tip for the probe. A small cavity extends through the center of the tip of plug 30 and contains the sensing element 32 which may comprise, for example, a thermistor. The sides of plug 30 smoothly mate with sleeve 28 and the seam between the plug and vinyl are sealed with a suitable potting adhesive. The portion of the cavity not filled by thermistor 32 is similarly sealed. The electrical leads 34 and 36 from the thermistor extend through the bore of plug 30 and spring 26 and through the length of tubing 20 to the required pins of connector 22 for future connection to associated electronic equipment.

The tubing 20, in addition to interconnecting the probe handle 18 with connector 22, also serves to relieve stresses on the patient while the thermometer is in use and to keep the probe from contact with the patient's environment by providing resilient support for the probe. To this end, the tubing is formed of a semi-rigid material which will support itself and the probe during use. That is, the tubing is sufficiently rigid to maintain itself and the probe in a semi-coiled position between the patient and connector and thereby stand away from the patient rather than lie limply over the patient. Nylon and acetate butyrate tubing were successfully used in practices of this invention. In both cases, the tubing which was approximately 70 inches long had an outside diameter of 0.125 inch and an internal bore of 0.059 inch.

Thus, in accordance with the above an improved temperature probe fulfilling the above mentioned objects is provided. It should be understood that modifications may be made in the described embodiment of my invention without departing from the invention as set forth in the accompanying claims.

Having thus described the invention what is claimed is:

1. A probe for an electronic medical device comprising: an elongated member terminating in a blunt end and having an end opposite said blunt end, said elongated member including a closely wound, longitudinally extending spring having an open center portion and a sleeve of flexible material closely disposed about said spring whereby said elongated member is relatively rigid in the longitudinal direction and flexible in the lateral direction to enable said member to be inserted into a body orifice of a patient and to collapse before the force which may be transmitted through said member can cause trauma to said patient; a sensing element mounted in the blunt end of said elongated member; connecting means adapted to electrically interconnect said sensing element and associated electronic equipment a plurality of electrical leads interconnecting said sensing element and connecting means, said leads extending from said sensing element through said spring open center portion to said connecting means; and an elongated, semi-rigid, hollow tube extending between said elongated member opposite end and said connecting means, said tube containing said electrical leads and adapted to provide resilient support for said elongated member.

2. The probe in accordance with claim 1 wherein said blunt end is defined by a plug of relatively soft material closing one end of said plastic sleeve.

3. The probe in accordance with claim 1 wherein said semi-rigid, hollow tube is formed of acetate tubing.

4. The probe in accordance with claim 1 wherein said semi-rigid tube is formed of nylon tubing.

* * * * *